Inventor
Antoine Brueder
By his attorneys
Howson and Howson

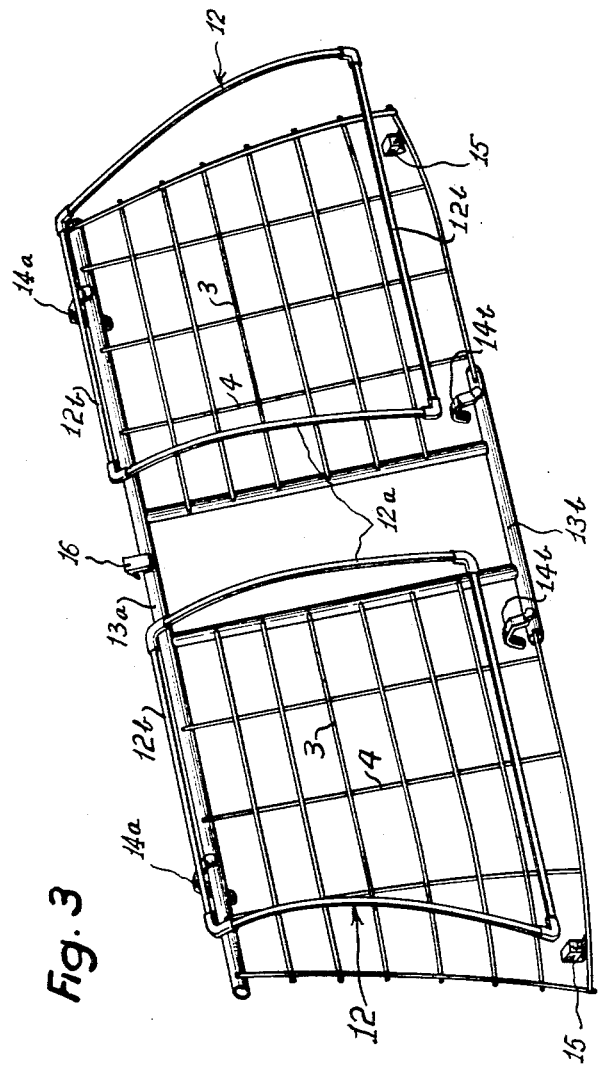

:::
United States Patent Office 2,931,426
Patented Apr. 5, 1960

2,931,426
MOTOR VEHICLE SEATS

Antoine Brueder, Paris, France, assignor to Societe Anonyme Andre Citroen, Paris, France, a French company Application September 19, 1956, Serial No. 610,801

Claims priority, application France September 24, 1955

2 Claims. (Cl. 155—179)

The present invention relates to a seat for motor vehicles.

According to the invention at least the back of a seat for a motor vehicle comprises a semi-rigid element, a flexible and elastic padding secured to said element and a cover enclosing said padding, the various elements of the seat being prefabricated and afterwards assembled together.

The semi-rigid element is advantageously constituted by a frame preferably made of tubes or rods and a spring-supporting framework mounted thereon.

The upper part of the main frame is preferably surmounted by an elastic flexible rod. This rod absorbs shocks and prevents the head or neck of a passenger from striking against the structure after compressing the padding.

In the case of a two-passenger seat with an arm-rest disposed between the two seats, the semi-rigid element is advantageously formed by two spring frameworks manufactured separately and connected by a rigid member which serves as a securing means.

The rigid member connecting the frameworks may carry securing hooks, the free wings of the frameworks carrying spring locking devices which co-operate with stopping blocks.

In order that the invention may be more clearly understood, reference will now be made to the accompanying drawings showing two specific embodiments thereof by way of example, and in which:

Fig. 3 is a perspective view of the semi-rigid element of a rear bench seat, the springs not being shown in order to simplify the drawing.

Figures 1, 2:
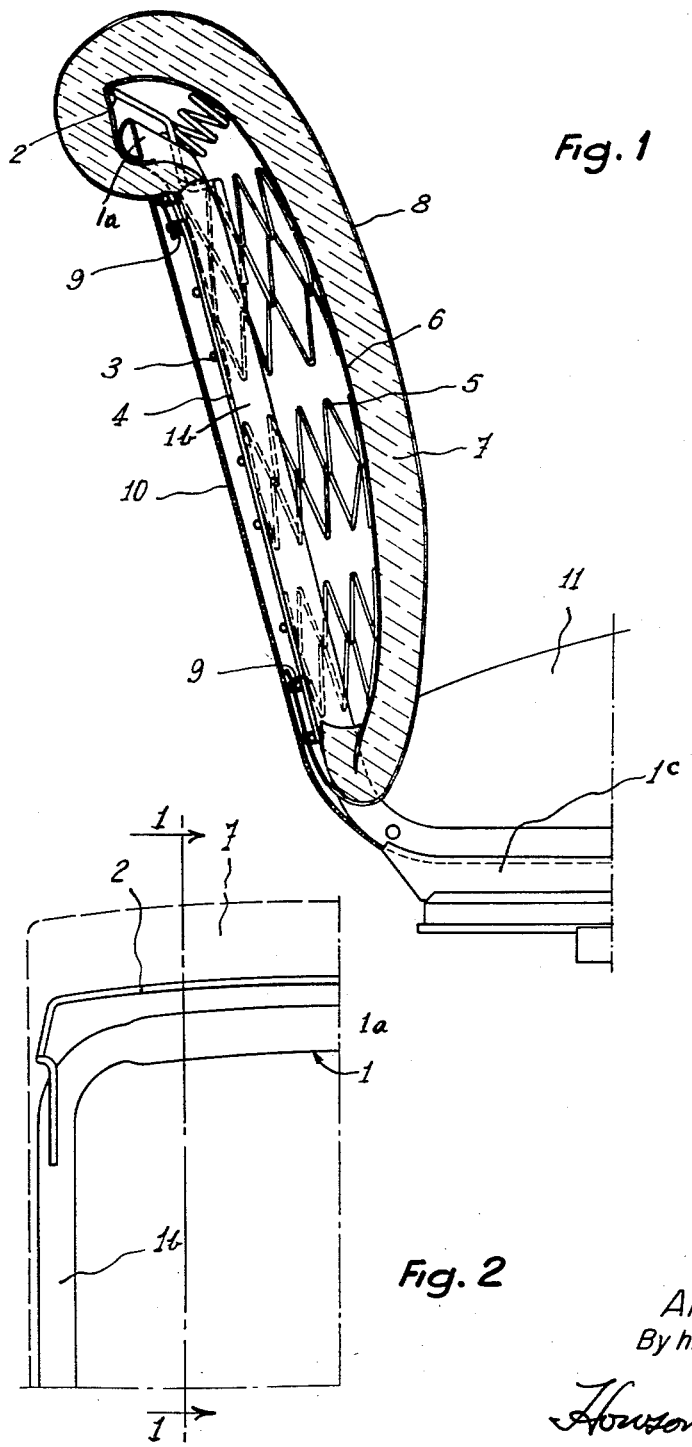
Fig. 1 is a vertical section view of one form of seat, embodying the invention, the section being taken along line 1—1 of Fig. 2.
Fig. 2 is a fragmentary elevation view of one corner of the main frame of Fig. 1.

Referring now to Figs. 1 and 2, the back rest of the seat comprises a main frame 1 consisting of an upper substantially horizontal member 1a connected by two similar parallel substantially vertical side arms such as 1b, the lower ends of which are bent horizontally and adapted to be attached to a horizontal cradle 1c, the parts 1a and 1b being preferably bent from one tubular rod. The horizontal upper member 1a is surmounted by a U-shaped elastic rod 2, the ends of which are bent obliquely and secured by welding or otherwise to the side arms 1b. This rod absorbs shocks and prevents the head or neck of a passenger from striking against the structure after compressing the padding.

A semi-rigid framework formed by a series of spaced horizontal rods 3, connected by a series of spaced vertical rods 4 on which are mounted coiled compression springs 5, is secured to the main frame by means of hooks (as in Fig. 3 as presently to be described) or bolts or by means of welding.

This framework is covered over by a coarse grained canvas 6 cut out in advance and secured for instance by means of conventional hooks, to the end horizontal rods 3 of the framework.

This assembly is then fitted with a padding 7 made of a cellular flexible and elastic material which is moulded or cut out into one or several pieces from a slab which is of uniform thickness. This padding is then preshaped and assembled by means of fasteners, adhesive strips, glue or any other desired means. By way of example it is possible to glue on the upper edge of the padding a cloth having a fold in which is introduced a reinforcing rod, said rod being afterwards secured by means of fasteners to one of the upper rods 3 of the framework. The lower edge of the padding can be secured in the same way to the framework but the reinforcing rod is however, not so necessary in this case.

The back is afterwards provided with a cover made of cloth, fabric, leather or a plastic material 8 which has also been cut, shaped and sewn in advance. This cover is secured to the framework for instance by means of fasteners 9.

Lastly a rear cover panel 10 is fixed at the rear of the back to hide the various fittings.

The seat 11, itself can be manufactured in the same way if desired.

In the case of a seat located on surfaces of the vehicle body itself, as is often the case with a rear seat, it is possible to omit the elastic rod 2.

On the other hand, if an arm rest is to be provided, it is advantageous to form the main frame with two over-frames 12 as shown in Fig. 3. In this figure, like parts in Fig. 1 bear like reference numerals. The over-frames are generally rectangular with curved parallel side arms such as 12a connected at top and bottom by horizontal rods 12b. The over-frames are connected near their tops by rigid tubular elements 13a, the connection being made in such a way that the top horizontal rods 12b are a short distance above the top connecting tube 13a.

In the embodiment shown, the upper tubes 13a carry hooks 14a which can be hooked over an interconnecting member (not shown) secured to the body. The lower tubes 13b of the main frame which are shorter than the upper tubes have similar hooks 14b for similar purpose. The wings or outermost portions of the spring supporting frameworks which are free and slightly floating, carry spring oscillating locking devices 15 which can be hooked to anchoring means such as pegs or blocks (not shown) secured to the body.

The assembly formed by the two frameworks 12 is then covered as in the embodiment of Figs. 1 and 2 by a padding and a cover, the cover being secured to the tubes for instance by hooks 16 welded thereto, one only of which is shown in order to simplify the drawing.

It will be apparent that the invention is not limited to the specific embodiments described and shown but on the contrary covers all modifications of these embodiments.

What I claim is:

1. In a motor vehicle seat, a rigid main frame comprising a horizontal top member, two approximately parallel members extending substantially perpendicularly to said horizontal top member and rigidly attached thereto, a supporting resilient framework mounted on said main frame, an inverted U-shaped elastic rod extending above and adjacent the rigid main frame and being rigidly affixed thereto at its lower ends to allow its upper part to move, a resilient cushion assembly mounted on said framework including padding overlying both said U-shaped rod and said main frame, a cover enclosing said padding and main frame and secured to said main frame, said U-shaped rod and padding being in position to prevent the head or neck of a passenger from striking the horizontal rigid top member of the main frame after compressing the cushion assembly thereover.

2. In a motor vehicle seat, a rigid main frame comprising a horizontal top member, two approximately parallel members extending substantially perpendicularly to said horizontal top member and rigidly attached thereto, a supporting resilient framework mounted on said main frame, a U-shaped elastic rod extending above and adjacent the rigid main frame and being rigidly affixed thereto at its lower ends to allow the upper part to move, a resilient cushion assembly mounted on said framework, a sheet of strong material secured to the ends of said framework and covering said U-shaped rod and framework, padding over said sheet and main frame U-shaped rod, and a cover secured to said framework and enclosing said padding, said U-shaped rod being in position to prevent the head or neck of a passenger from striking the horizontal rigid top member of the main frame after compressing the cushion assembly thereover.

References Cited in the file of this patent

UNITED STATES PATENTS

| | | |
|---|---|---|
| 2,313,020 | Nussbaum | Mar. 2, 1943 |
| 2,420,220 | Bartlett et al. | May 6, 1947 |
| 2,649,895 | Stubnitz | Aug. 25, 1953 |
| 2,756,808 | Eichorst | July 31, 1956 |